July 12, 1960 R. J. NAEGELE, JR 2,944,398
COMBUSTION CHAMBER FOR JET PROPULSION MOTORS
Filed Oct. 20, 1954 2 Sheets-Sheet 2

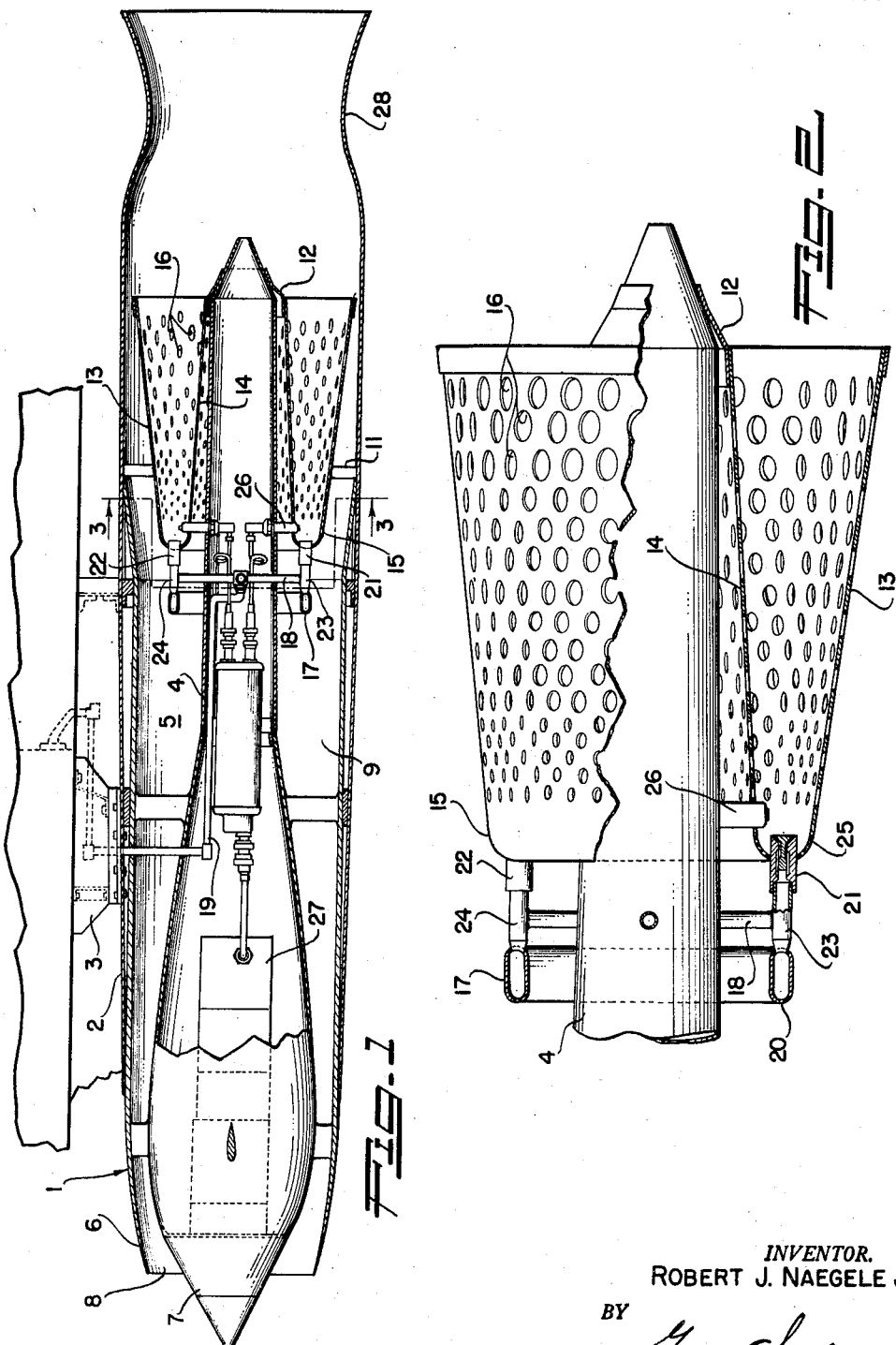

INVENTOR.
ROBERT J. NAEGELE JR.
BY
George Sullivan
Agent

United States Patent Office 2,944,398
Patented July 12, 1960

2,944,398

COMBUSTION CHAMBER FOR JET PROPULSION MOTORS

Robert J. Naegele, Jr., Van Nuys, Calif., assignor to Lockheed Aircraft Corporation, Burbank, Calif.

Filed Oct. 20, 1954, Ser. No. 463,489

2 Claims. (Cl. 60—39.82)

This invention relates generally to jet propulsion devices and, more particularly to a combustion chamber for ramjet engines, and the like.

Conventional combustion chambers for jet propulsion devices of the type referred to above normally utilize only a small portion of the ram air for combustion and subsequently mix the hot gases of combustion with the bulk of the ram air to obtain thrust and maintain a nearly constant combustion chamber discharge temperature. With such an arrangement the efficiency of operation depends largely upon proper timing for the introduction of the dilution air. If the dilution air is introduced before the fuel is completely burned incomplete combustion will result from too lean a mixture. If the dilution air is introduced subsequent to complete combustion of the fuel, proper mixing of the dilution air with the products of combustion will not be accomplished and the combustion chamber discharge temperature will be non-uniform, causing hot spots to develop in the exhaust gases. Thus it is obvious with conventional combustion chamber designs that the timing of the introduction of the dilution air is vitally important for efficient engine operation. Since the temperature and moisture content of the incoming air, as well as the temperature of the engine itself affect the fuel burning rate, it is impossible, as a practical matter, to construct an engine based on this design approach which will introduce the dilution air at the proper time for all operating conditions. As a result, the operating efficiency of jet propulsion devices utilizing the conventional type of combustion chamber is relatively low as compared with the efficiency of piston engines.

Design of ramjet engines utilizing the idea of mixing fuel with all or substantially all of the ram air has been undertaken by others in the recent past, however the method of burning the fuel in such instances has met with but limited success. The usual burner construction is a transverse network of channels which produce a relatively small number of large air pressure vortices. These large pressure vortices are unstable over a wide range of engine operation and as a consequence burning is frequently sporadic and incomplete. Moreover, the random turbulent air-fuel mixture in the burning area proper makes it difficult, if not impossible, to dependably avoid blow-out of the pilot flame.

An object of this invention is to provide a combustion chamber for ramjet engines, and the like, which mixes fuel with all of the incoming air to produce an air-fuel combustible mixture which is subsequently ignited and caused to burn to completion in a double walled annular burner, thus eliminating the requirement for introducing dilution air at the proper time to maintain a reasonably high operating efficiency. The burner, by virtue of its construction, will effect complete and substantially instantaneous combustion of the air-fuel mixture to maintain a nearly uniform combustion chamber discharge temperature for producing a relatively high operating efficiency under all operating conditions.

Another object of this invention is to provide a combustion chamber burner for ramjet engines, and the like, which will effect a nearly uniform concentration of the air-fuel mixture to insure complete combustion.

Another object of this invention is to provide a combustion chamber burner for ramjet engines, and the like, which provides a sheltered pilot flame channel in the upstream end of the burner to effect dependable ignition of the air-fuel mixture and which requires short characteristic lengths of flame propagation.

Still another object of this invention is to provide a combustion chamber burner configuration which is characterized by its simplicity, light-weight and high structural reliability.

Further and other objects will become apparent from a reading of the following description, especially when considered in combination with the accompanying drawing wherein like numerals refer to like parts.

In the drawings:

Figure 1 is a fragmentary sectional side view of a ramjet engine incorporating the combustion chamber of this invention.

Figure 2 is a fragmentary side view of the combustion chamber burner;

Figure 3:
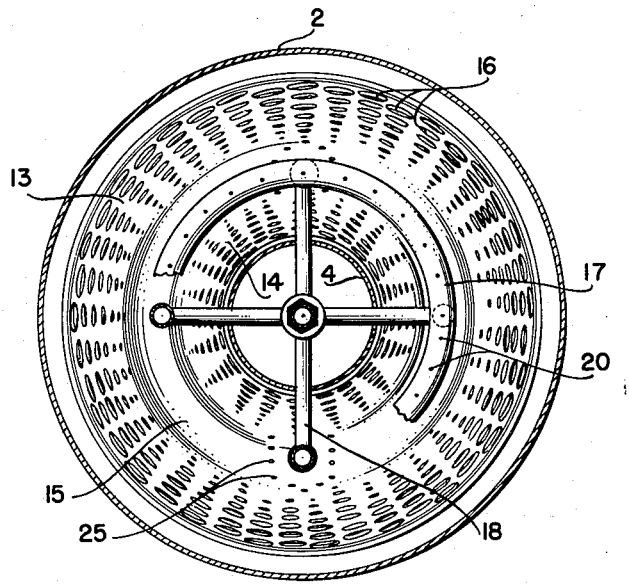
Figure 3 is a sectional view taken on line 3—3 of Figure 1.

Referring to Figure 1, ramjet engine 1 includes a generally tubular housing 2 having suitable brackets 3 secured thereto for supporting the engine on a vehicle such as a missile. A centerbody 4, concentrically carried within housing 2, forms an annular air passage 5 through the housing. A cone 7, carried by centerbody 4, extends axially beyond the forward or upstream end 6 of the housing for controlling the formation of shockwaves at the ramjet air inlet 8. Cone 7 is shaped to provide the proper air flow characteristics within air passage 5 for forming a subsonic diffuser section 9 within the engine.

An annular burner 10, concentrically arranged within housing 2, is located downstream from diffuser section 9 and secured by brackets 11 to housing 2 and by brackets 12 to centerbody 4. Burner 10 includes a frustum-shaped outer wall 13 and a frustum-shaped inner wall 14 which are reversely arranged one within the other and connected at the small diameter end of outer wall 13 and the large diameter end of inner wall 14 by an annular channel member 15 at the upstream end of the burner. Burner walls 13 and 14 diverge in a downstream direction to require substantially all of the ram air to be directed through the walls of the burner before being exhausted from the engine. Channel member 15, at the upstream end of burner 10 bisects annular air passage 5 to divide the flow of air through the passage, such that substantially the same quantity of air will be directed between inner wall 14 and centerbody 4 as is directed between outer wall 13 and housing 2. A large number of generally circular openings 16 are formed in burner outer and inner walls 13 and 14 respectively, for admitting the upstream air into burner 10. As best shown in Figure 2, the size of openings 16 vary from a minimum at the upstream end of the burner adjacent channel member 15 to a maximum at the downstream end of the burner whereby the pressure vortices of the incoming air will penetrate deeper into the burner at the downstream openings.

An annular fuel injection nozzle 17, arranged concentrically of the housing within air passage 5, is carried by centerbody 4 through a plurality of radially directed fuel tubes 18 as shown in Figures 1 and 3. Fuel tubes 18 connect with a main fuel flow pipe 19 which is directed outside centerbody 4 and housing 5 to connect with a suitable fuel storage chamber, not shown, in the vehicle on which the engine is mounted. Primary fuel injection nozzle 17 is located at the downstream end of diffuser section 9 immediately upstream from burner 10. A plurality of small orifices 20 in primary nozzle 17 release fuel in an upstream direction under pressure to mix with the incoming air in diffuser section 9 and form a combustible mixture. As the air-fuel mixture moves downstream and enters burner 10 through the plurality of apertures 16 of both the inner and outer burner walls, the incoming air-fuel mixture is mixed with the burning gases from the preceding stages of admission.

The combustible air-fuel mixture is ignited and burned by a pilot flame generated within the burner adjacent the ram air shielding channel member 15. A pair of pilot flame fuel injection nozzles 21 and 22 project into burner 10 at the extreme leading edge of channel member 15 at locations disposed approximately 180° from each other. The number of pilot injection nozzles required for best operation depends upon such things as the size of the engine. For smaller engines only one pilot nozzle would likely be sufficient. Fuel is supplied to pilot fuel injection nozzles 21 and 22 by couplings 23 and 24 communicating with the annular primary fuel injector 20 and the radially directed tubes 18. The fuel from pilot nozzles 21 and 22 is mixed with a relatively small quantity of the primary air-fuel mixture in the shielded section of the burner by providing a plurality of small apertures 25 in channel member 15 around each pilot nozzle. In this manner, a rich and easily ignited combustible air-fuel mixture is obtained for producing the pilot flame.

Burning of the pilot flame is initiated by suitable means such as an igniter plug 26, one for each pilot flame fuel injection nozzle 21 and 22, which is carried by centerbody 4 and projects radially outwardly from the centerbody into burner 10 adjacent the pilot fuel nozzle. A spark is produced with igniter plug 26 for initiating the burning of the rich air-fuel pilot flame mixture by means of a suitable source of electrical potential which may be carried in centerbody 4, as shown at 27 in Figure 1.

Since the annular channel member 15 is provided with apertures 25 only at the pilot flame fuel injection nozzles 21 and 22, the pressures existing at the upstream end of the burner will be quite low, causing the rich pilot flame air-fuel mixture to flow around on the inside of the annular channel member and provide a continuous annular flame front when ignited by igniter plugs 26 for burning the primary air-fuel mixture entering the burner through openings 16 in burner walls 13 and 14. The pilot flame being shielded from the direct flow of air through the ramjet will ignite easily and stay lit throughout the operation of the engine. The lateral propagation of the pilot flame at the upstream end of the burner is accompanied by flame propagation in a downstream direction by the low pressure paths formed between the primary air-fuel mixture pressure vortices generated by the rapid flow of the mixture through apertures 16 in the burner walls. These low pressure paths downstream from channel member 15 serve to ignite the primary air-fuel mixture flowing into burner 10 substantially simultaneously whereby complete burning of the fuel is accomplished prior to the time it is exhausted from the engine through the exhaust tail cone 28.

As shown in Figure 1, centerbody 4 extends downstream only slightly beyond burner 10 whereby the hot gases flowing from the burner are combined inside the combustion chamber prior to being exhausted through the tail cone.

Figure 4:
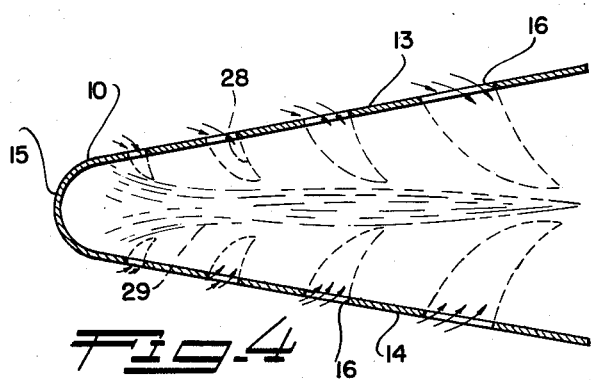
Figure 4 is a schematic diagram illustrating burner operation.

The manner in which the pilot flame is propagated within burner 10 is best shown in Figure 4 wherein the primary air-fuel mixture pressure vortices 28 penetrate into the burner a depth depending upon the size of the apertures 16; the larger the aperture the greater the penetration. Thus the primary air-fuel mixture is directed well into the central area of the burner from both the outer and inner burner walls 13 and 14 respectively. The pilot flame which originates in the upstream of burner 10 adjacent channel member 15 spreads within the burner along the low pressure paths between the primary air-fuel mixture pressure vortices 28, both near the inner and outer walls and in the center of the burner whereby the air-fuel mixture entering apertures 16 are ignited substantially simultaneously for completing the burning of the fuel by the time the air-fuel mixture leaves the downstream end of the burner or shortly thereafter.

In operation, the ramjet functions to produce thrust by heating ram air passing through the motor, causing the same to expand and thereby increase its exit velocity. This difference in velocity between the exhaust gases and the intake air produces the thrust for propelling the vehicle to which the engine is mounted. In order for an engine of this type to operate, however, the intake or ram air must have a predetermined initial operating velocity to provide a sufficiently high burner static pressure and to prevent blowback by the hot gases. This initial velocity required for engine operation is normally obtained by the use of auxiliary power such as booster rockets.

When the velocity of the intake air reaches a certain minimum value, fuel is supplied to the ramjet fuel injectors through fuel line 19, as shown in Figure 1. The primary injector 20 releases a spray of fuel into diffuser section 9 of the engine which mixes with the incoming air to produce a combustible mixture as it moves downstream toward burner 10. When the primary injector 20 is supplied with fuel, pilot flame fuel injection nozzles 21 and 22 likewise receive fuel from the same source, which is sprayed into burner 10 at the upstream end adjacent channel member 15. Apertures 25 in channel member 15 admit sufficient primary air-fuel mixture to mix with the fuel from the pilot flame fuel injection nozzles to produce a highly combustible mixture in the ram air shielded zone of burner 10. A spark emitted by igniter plug 26 readily ignites the rich air-fuel pilot flame mixture. The pilot flame rapidly propagates within burner 10 along the low pressure paths, as described hereinabove in connection with Figure 3 to ignite the primary air-fuel mixture as it enters the burner through openings 16. The pilot flame effects combustion of the mixture within the burner almost simultaneously rather than by a chain-reaction type of burning. In this manner the combustible fuel is efficiently burned prior to being exhausted through tail cone 28 of the engine.

During combustion, the temperature of the air is increased, causing the same to expand. Since the gases of combustion expand and since the volume of the combustion chamber in the engine is fixed, the gases are rapidly accelerated in a downstream direction to produce thrust.

The configuration of burner 10 not only provides efficient combustion of the primary air-fuel mixture but also serves to propagate the pilot flame. By employing small openings 25 in channel member 15 of the burner only adjacent the pilot injector nozzles, a low pressure network is formed, which will avoid blowout of the pilot flame and allow the use of a simple pilot flame fuel injector nozzle arrangement.

The configuration of burner 10 allows a combustion chamber design for ramjets, and the like, which is structurally reliable and easy to manufacture as well as efficient in operation.

It is to be understood that certain alterations, modifications and substitutions may be made to the instant disclosure without departing from the spirit and scope of this invention as set forth in the appended claims.

I claim:
1. A ram jet engine comprising a generally tubular housing, a centerbody concentrically carried within said housing and forming an annular air passage through the housing, an annular burner centrally located within said passage, said annular burner having downstream diverging walls and a rounded solid walled annular channel connected to the upstream ends of said walls so as to form an annular area therein, sheltered from air passing through the housing, for a continuous annular pilot flame at the upstream end of the burner, fuel supply piping in said centerbody extending upstream of said burner, a plurality of circumferentially spaced pilot flame fuel injection nozzles projecting through the upstream portion of said pilot flame channel to supply fuel thereto, said nozzles being rigidly connected to said fuel supply piping, igniter means projecting from said centerbody into said pilot flame channel adjacent to and a short distance downstream of said nozzles, an annular primary fuel injector ring adjacent said pilot fuel nozzles and upstream thereof, said fuel injector ring connected to said fuel supply piping to release fuel within said air passage, said diverging burner walls having a plurality of generally circular openings formed therein downstream from said annular channel and extending in a downstream direction toward the ends thereof for directing the combustible air fuel mixture into said burner, said openings being progressively larger in a downstream direction, and small openings in said channel adjacent said nozzles for supplying a pilot air-fuel mixture thereto which is supplemented by the fuel from the nozzles to provide a rich mixture which will propagate an annular pilot flame in the channel.

2. A ram jet engine as set forth in claim 1 wherein said primary fuel injector ring and said pilot fuel nozzles are connected to a common fuel supply member projecting from said centerbody.

References Cited in the file of this patent

UNITED STATES PATENTS

| | | |
|---|---|---|
| 2,422,213 | Smith | June 17, 1947 |
| 2,543,755 | Berger | Mar. 6, 1951 |
| 2,592,110 | Berggren et al. | Apr. 8, 1952 |
| 2,595,999 | Way et al. | May 6, 1952 |
| 2,672,726 | Wolf et al. | Mar. 23, 1954 |
| 2,672,727 | Brown | Mar. 23, 1954 |
| 2,679,137 | Probert | May 25, 1954 |
| 2,771,743 | Lovesay | Nov. 27, 1956 |
| 2,775,867 | Collins | Jan. 1, 1957 |
| 2,780,916 | Collins | Feb. 12, 1957 |
| 2,781,638 | Fletcher et al. | Feb. 19, 1957 |
| 2,798,360 | Hazen et al. | July 9, 1957 |
| 2,799,991 | Conrad | July 23, 1957 |